Figure 1:
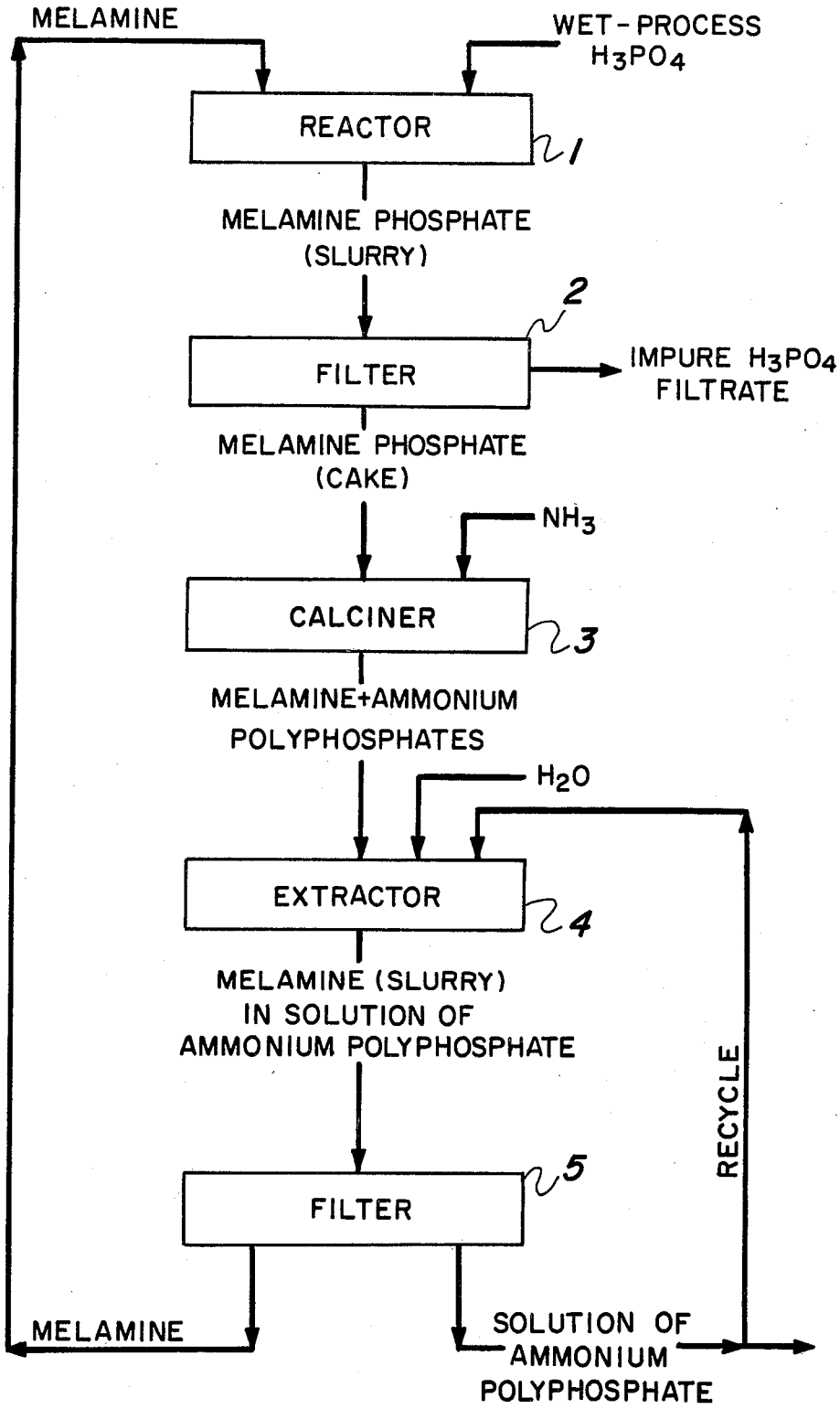
Figure 2:
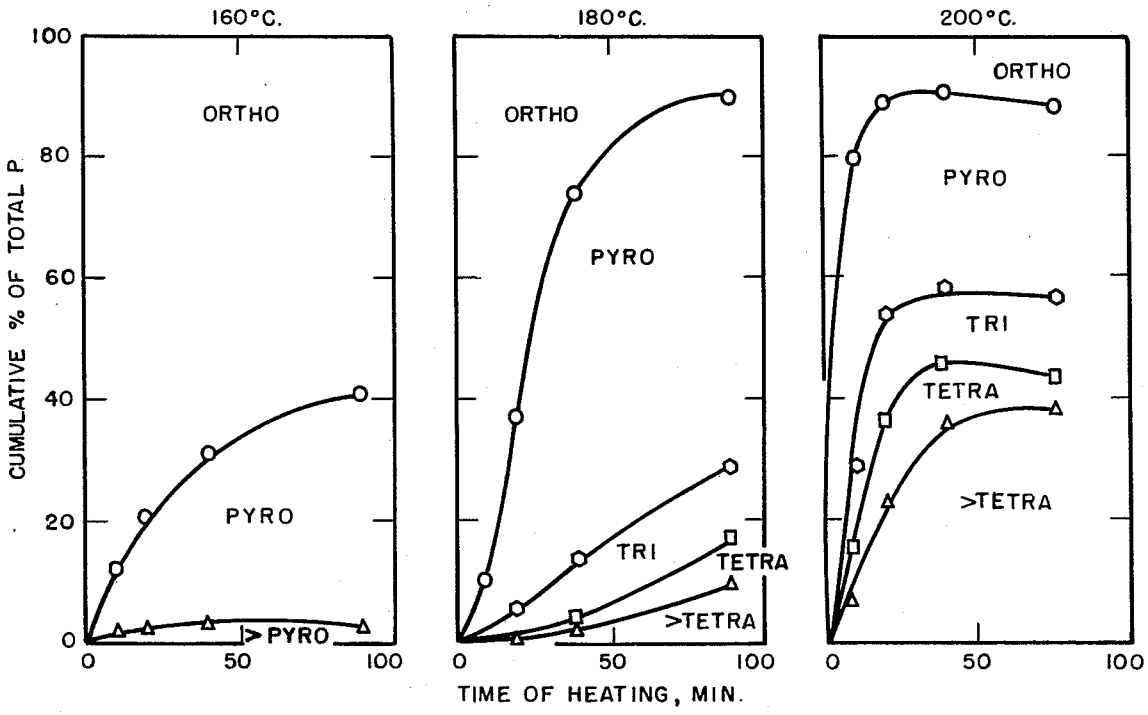

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 2, 1976

952 O.G. 8

T952,008

PRODUCTION OF AMMONIUM POLYPHOSPHATES FROM MELAMINE PHOSPHATES

John F. McCullough, Florence, and Richard C. Sheridan, Sheffield, Ala., assignors to Tennessee Valley Authority

Filed Oct. 6, 1975, Ser. No. 619,710
Int. Cl.[2] C01B *15/16, 25/26*
U.S. Cl. 423—305
2 Sheets Drawing. 10 Pages Specification

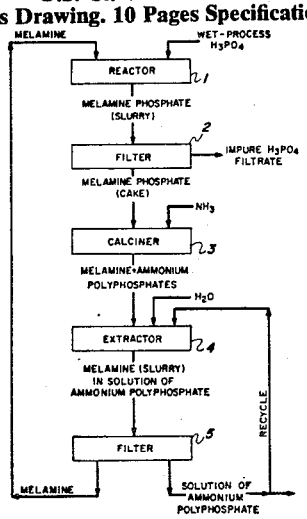

PREPARATION OF AMMONIUM POLYPHOSPHATE BY MELAMINE

Ammonium polyphosphates are prepared by a process which comprises heating melamine orthophosphate prepared from impure wet-process phosphoric acid in a stream of gaseous ammonia at a temperature between 150° C. and 210° C. to produce a mixture of melamine and relatively pure short-chain ammonium polyphosphates. The solid product is extracted with water to remove the ammonium polyphosphates and free the insoluble crystalline melamine. The melamine is recycled by treating it with phosphoric acid to make additional melamine orthophosphate. Thus, the only starting materials consumed in the process are phosphoric acid and ammonia.

The distribution of phosphate species in the product may be varied by regulating the time and temperature of heating. A product containing 59 percent ortho-, 38 percent pyro-, and 3 percent more highly condensed phosphates is obtained by heating for 90 minutes at 160° C.; heating for 40 minutes at 180° C. yields a product containing 26 percent ortho-, 60 percent pyro-, 10 percent tri-, 2 percent tetra-, and 2 percent more highly condensed phosphates; and heating for 20 minutes at 200° C. yields a product containing 11 percent ortho-, 35 percent pyro-, 17 percent tri-, 14 percent tetra-, and 23 percent more highly condensed phosphates. At temperatures above about 210° C., no ammonium polyphosphates are formed and melamine long-chain polyphosphate is the product.

PREPARATION OF AMMONIUM POLYPHOSPHATE BY MELAMINE

EFFECT OF TIME AND TEMPERATURE ON THE CUMULATIVE DISTRIBUTION OF SPECIES IN AMMONIUM PHOSPHATES PREPARED FROM MELAMINE PHOSPHATE
(Distance between curves represents the percentage of species)